US009716543B2

(12) United States Patent
Gouillou et al.

(10) Patent No.: US 9,716,543 B2
(45) Date of Patent: Jul. 25, 2017

(54) METHODS, SYSTEMS, AND COMPUTER READABLE MEDIA FOR MANAGING AIRCRAFT RADIOFREQUENCY COMMUNICATIONS

(71) Applicant: Airbus Operations (S.A.S.), Toulouse (FR)

(72) Inventors: Jerome Gouillou, Colomiers (FR); Benoit Gauduin, Toulouse (FR); Luciano Domingos Neves, Belo Horizonte (BR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 14/824,040

(22) Filed: Aug. 11, 2015

(65) Prior Publication Data
US 2017/0047983 A1    Feb. 16, 2017

(51) Int. Cl.
*H04B 1/40*      (2015.01)
*H04B 7/185*     (2006.01)
*G08G 5/00*      (2006.01)
*G08G 5/02*      (2006.01)

(52) U.S. Cl.
CPC ....... *H04B 7/18506* (2013.01); *G08G 5/0013* (2013.01); *G08G 5/0021* (2013.01); *G08G 5/0052* (2013.01); *G08G 5/0065* (2013.01); *G08G 5/025* (2013.01)

(58) Field of Classification Search
CPC ............. H04B 7/18506; G08G 5/0013; G08G 5/0021; G08G 5/0052; G08G 5/0065; G08G 5/025
See application file for complete search history.

(56) References Cited

U.S. PATENT DOCUMENTS 6,473,675 B2 * 10/2002 Sample .................. G01S 1/045
                                              701/14
8,135,399 B2    3/2012 de La Tousche et al.
8,149,141 B2    4/2012 Coulmeau et al.
(Continued)

FOREIGN PATENT DOCUMENTS

FR    2 909 795 A1    6/2008
FR    2 915 644 A1    10/2008

*Primary Examiner* — Xin Jia
(74) *Attorney, Agent, or Firm* — Jenkins, Wilson, Taylor & Hunt, P.A.

(57) ABSTRACT

Methods, systems, and computer readable media for managing aircraft radiofrequency communications on board an aircraft are disclosed. In some aspects, a method can include determining at least one communication frequency, the at least one communication frequency corresponding to a communication center within a radio horizon of the aircraft, displaying the at least one communication frequency at an interface, and where there is more than one communication frequency displayed on the interface: filtering the more than one communication frequency according to a flight step of the aircraft in order to reduce a number of the more than one communication frequency displayed on the interface, and sorting the more than one communication frequency according to occupation rate in order to prioritize the more than one communication frequency displayed on the interface, and thereby aid in predicting a communication frequency communicated to the aircraft.

20 Claims, 8 Drawing Sheets

(56) References Cited

U.S. PATENT DOCUMENTS

| | | | |
|---|---|---|---|
| 2009/0005034 A1* | 1/2009 | de la Tousche | G01C 23/00 |
| | | | 455/431 |
| 2013/0229955 A1* | 9/2013 | Xu | H04W 52/18 |
| | | | 370/280 |
| 2014/0024395 A1* | 1/2014 | Johnson | H04W 4/02 |
| | | | 455/456.3 |

* cited by examiner

METHODS, SYSTEMS, AND COMPUTER READABLE MEDIA FOR MANAGING AIRCRAFT RADIOFREQUENCY COMMUNICATIONS

TECHNICAL FIELD

This disclosure relates to the field of aircraft communications. More particularly, this disclosure relates to methods, systems, and computer readable media for managing aircraft radiofrequency communications.

BACKGROUND

Whether on the ground or in flight, an aircraft communicates using a radio link with external nodes, for example with an air traffic control (ATC) center, station, or facility, as well as to any communications center for communications with the airline, in order to exchange data relating especially to the movement of the aircraft. In particular, when an aircraft is in flight, the crew on board the aircraft, for e.g., the pilot or the co-pilot, communicates by radio link with the ground staff, for e.g., the air traffic controller, in order to exchange flight related data.

For example, the communications between the ATC center and the aircraft may comprise data relating to a flight sector, a flight level, a speed of the aircraft, a frequency of transmission and/or reception of messages to be exchanged with ground staff, etc. In addition, the ATC center and aircraft communications may relate to very high frequency (VHF) communications.

Indeed, each area of aeronautical space, such as airports and airspace, is sectorized, i.e., broken into virtually defined airspace regions that are managed by a designated communications center. For example, each sector of airspace is known as an 'ATC sector', which is managed by one designated ATC center. There may be one or several active ATC sectors in a given flight information region (FIR). In some aspects, a number of active ATC sectors is dynamically managed by the designated ATC center depending on a density and/or complexity of air traffic. Each active ATC sector is assigned a single VHF frequency. In a given ATC sector, therefore, an aircraft will only interact with the designated ATC center on the assigned VHF frequency channel.

When an aircraft passes through one ATC sector and enters a new ATC sector, the crew of the aircraft needs to know the frequency of the radio channel of the ATC center of the new ATC sector. Thus, the crew of the aircraft needs to be informed of the radiofrequency of the ATC center of the new ATC sector before leaving the former ATC sector so that it can come into contact with the ATC center of the new ATC sector as soon as it enters the new ATC sector. For example, when an aircraft reaches an end of a first ATC sector, an ATC center associated with the first ATC sector may transmit the new VHF frequency on which the pilot will be communicating with the ATC center of the second ATC sector to a crew member (e.g., pilot) in charge of communications on board the aircraft. Generally, the pilot then tunes to this new frequency on a display unit of the cockpit, e.g., a radio and audio management panel (RMP).

Generally, through regulations-specified documents such as maps, the pilot is aware of which ATC centers the pilot will be communicating with throughout the flight, depending on the maneuvers that he will have to make (for example landing, take-off, cruising, etc.). Thus, when the pilot receives information on the frequency of the new ATC sector, for the most part, the pilot is already aware of the ATC sector concerned. Regardless, the frequency of the new ATC center is communicated to the pilot by the previous ATC center so that the pilot can prepare to use the new frequency by tuning the channel frequency on a display unit of the cockpit. However, this procedure can be problematic without any corroborating information. For example, amplitude modulation (AM), which is predominately used in aircraft radio communications, can provide high noise level and signal attenuation, thereby decreasing audio quality of the transmission. Such a decrease may result in a mistake in channel tuning by the pilot.

To resolve this issue, interactive display screens that present communication frequency values for ATC centers within an aircraft's radio frequency horizon and provide useful information regarding each frequency are used to enable the pilot to confirm that the pilot is tuning to the correct frequency. Databases which, for example, associate the assigned frequency to the respective ground station, in addition to the type of services provided, designated operational coverage (DOC), and boundaries of the FIRs, may provide such useful information.

Yet, such displays tend to present all possible communication frequency values for ATC centers within the aircraft's radio frequency horizon (regardless of flight level, services provided, occupation rate of frequency channel, etc.), which, while useful, can be unwieldy for a pilot trying to corroborate the new communication frequency provided by an ATC center. Specifically, these displays include communication frequency values for channels with a high occupancy rate mixed in with channels having a low occupancy rate. However, frequency channels that are highly trafficked (i.e., have a high occupancy rate) generally have a higher probability of being selected by the previous ATC station as the new VHF frequency on which the pilot will be communicating with the new ATC station than lower frequency channels.

Accordingly, there is a need for an ability to organize these displayed frequency channels in order to sort high occupancy channels as higher priority channels and low occupancy channels as lower priority channels, thereby simplifying evaluation of which frequencies may be communicated by a previous ATC center to the pilot.

SUMMARY

Methods, systems, and computer readable media for managing aircraft radiofrequency communications are disclosed. One method for managing aircraft radiofrequency communications on board an aircraft can comprise determining at least one communication frequency, the at least one communication frequency corresponding to a communication center within a radio horizon of the aircraft, displaying the at least one communication frequency at an interface, and where there is more than one communication frequency displayed on the interface: filtering the more than one communication frequency according to a flight step of the aircraft in order to reduce a number of the more than one communication frequency displayed on the interface, and sorting the more than one communication frequency according to occupation rate in order to prioritize the more than one communication frequency displayed on the interface, and thereby aid in predicting a communication frequency communicated to the aircraft.

The subject matter described herein also includes a system for managing aircraft radiofrequency communications on board an aircraft, which can comprise a computing platform comprising at least one processor and memory, and a management module utilizing the at least one processor and the memory. In some aspects, the management module can be configured to determine at least one communication frequency, the at least one communication frequency corresponding to a communication center within a radio horizon of the aircraft, display the at least one communication frequency at an interface, and where there is more than one communication frequency displayed on the interface: filter the more than one communication frequency according to a flight step of the aircraft in order to reduce a number of the more than one communication frequency displayed on the interface and sort the more than one communication frequency according to occupation rate in order to prioritize the more than one communication frequency displayed on the interface, and thereby aid in predicting a communication frequency communicated to the aircraft.

The subject matter described herein may be implemented in hardware, software, firmware, or any combination thereof. As such, the terms "function", "node" or "module" as used herein refer to hardware, software and/or firmware components for implementing the feature(s) being described. In one exemplary implementation, the subject matter described herein may be implemented using a non-transitory computer readable medium having stored thereon computer executable instructions that when executed by the processor of a computer cause the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF DRAWINGS

The subject matter described herein will now be explained with reference to the accompanying drawings of which.

DETAILED DESCRIPTION

The subject matter described herein includes methods, systems, and computer readable media for managing aircraft radiofrequency communications on board an aircraft to aid a pilot in tuning radio frequencies for voice communication with a corresponding air traffic control (ATC) center. In accordance with some aspects of this subject matter, the radio frequencies described herein can comprise airband frequencies or a group of frequencies in the very high frequency (VHF) radio spectrum allocated to civil aviation. For example, the following may include all radio frequencies in the VHF radio spectrum, including 118.000-136.975 MHz (with 8.333 MHz channel spacing). However, it will be understood that the radio frequencies described herein can comprise groups of frequencies in radio spectrums, other than airband frequencies, also dedicated to aeronautics and communications between an aircraft and a communications center.

Steps and algorithms for determining at least one communication frequency associated with an ATC center within a radio horizon of the aircraft are contemplated herein, however, the details of these steps and algorithms are outside the scope of this subject matter. Once at least one communication frequency is determined, the at least one communication frequency can be displayed on an interface in order to aid crew on board the aircraft in corroborating or predicting a radiofrequency of the new flight level and/or next ATC sector or ATC jurisdiction before leaving the previous one, such that the aircraft can come into contact with the next ATC center as soon as the aircraft enters the new flight level or ATC sector.

In some aspects, there can be more than one communication frequency displayed on the interface. In fact, it is likely that there are thirty or more possible communication frequencies displayed on the interface. In such a case, it may be advantageous to filter the frequencies in order to reduce the number of frequencies displayed. Filtering the list of communication frequencies by removing communication frequencies of ATC centers that are not compatible with the current flight step of the aircraft is one technique for reducing the number of frequencies displayed. The list of communication frequencies can additionally, or instead of, be further filtered to sort or prioritize communication frequencies, such that those with a low occupancy rate receive lower priority and are displayed in such a manner. For example, a radio module, such as a software defined radio (SDR) module, can be implemented by the methods, systems, and computer readable media disclosed herein to receive a signal transmitted from an ATC center, process that signal, and then compare it to a predefined noise power level measure in order to determine if the incoming signal is noise or a communications message. Inputting this result into a subsequent channel occupancy rate function can yield a ratio indicative of the occupancy rate of a specific frequency channel.

In some aspects, a prioritized presentation of frequencies can be based on an occupancy rate of the associated frequency channel. For example, those frequencies whose frequency channels comprise a low occupancy rate, as described in more detail below, can automatically be sorted as lower priority in the displayed list of frequencies, while those with a high occupancy rate that have not yet reached a point of saturation (i.e., where the channel cannot handle additional communication traffic), can be displayed with a high priority. This is because if the occupation rate is high, then the channel is in use by the ATC center and will probably be chosen to communicate with the aircraft. In some aspects, where one or more frequencies have reached a point of saturation, it can be advantageous to display low or silent frequencies at a same priority level as the saturated or otherwise highly occupied frequencies, since a silent or low frequency channel will need to be opened up to accommodate new communication traffic. Thus, prioritizing the communication frequencies in such a manner enables easier corroboration or prediction of a radiofrequency of the new ATC sector or next ATC jurisdiction.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
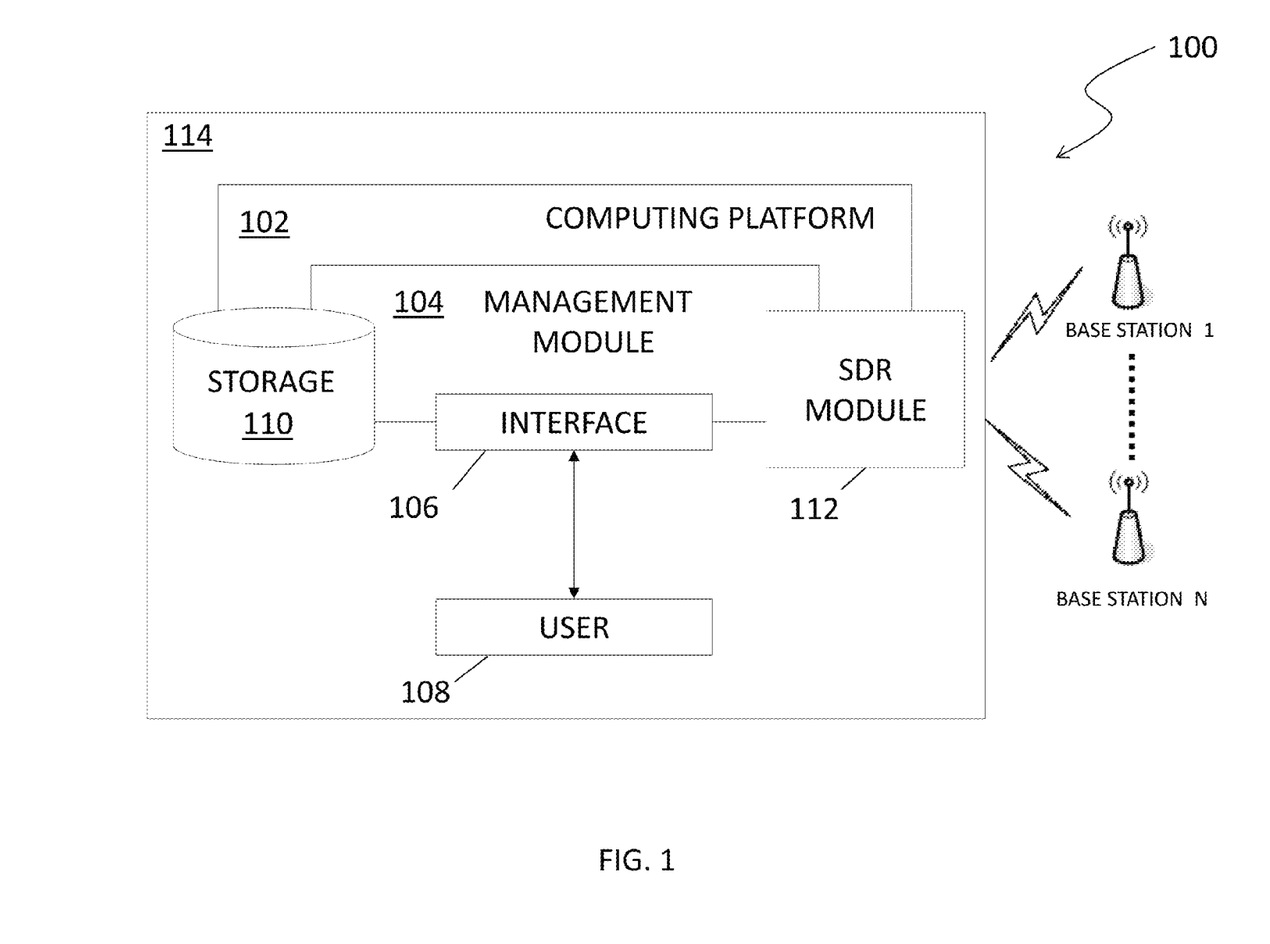
FIG. 1 is a block diagram illustrating an exemplary computing platform for managing aircraft radiofrequency communications according to an embodiment of the subject matter described herein.

FIG. 1 is a diagram illustrating an exemplary system, designated 100, comprising a computing platform 102 for managing aircraft radiofrequency communications on board an aircraft according to an embodiment of the subject matter described herein.

Computing platform 102 represents a network device, a network module, a node, or a system of devices, nodes, and/or modules. For example, computing platform 102 is in one aspect a flight control computer on board an aircraft that is capable of navigation, supervision of aircraft systems, and communication with other actors. In some aspects, computing platform 102 is a single node or can include functionality distributed across multiple computing platforms or nodes.

Computing platform 102 in one aspect includes or accesses a management module (MM) 104. MM 104 represents any suitable entity or entities (e.g., a computing platform, software executing on a processor, etc.) for performing one or more aspects associated with managing aircraft radiofrequency communications. For example, MM 104 determines at least one communication frequency for an associated air traffic control (ATC) center using an algorithm that considers several characteristics, such as, e.g., the radio horizon of the aircraft, aircraft geographic position and altitude, flight information region (FIR), frequencies of ground stations within the aircraft radio horizon, eligibility of frequencies, etc.

In some embodiments, computing platform 102 and/or MM 104 includes functionality for displaying the at least one communication frequency at an interface 106. Interface 106 in one aspect may comprise a radio management panel (RMP) and/or a screen and/or other display device configured to be interactive with users, systems, and/or nodes. Interface 106 in one aspect includes functionality to allow a user 108 (e.g., aircraft crew members) to manipulate elements of interface 106, such as, for example, programming frequencies, selecting frequencies, entering and manipulating text, maps and/or objects, zooming in and/or out, toggling the screen, etc.

Where MM 104 is implemented on a computing platform 102 that comprises a touch screen, a user 108 interacts with interface elements displayed on interface 106 by direct contact (e.g., finger contact) on the part of user 108. Furthermore, computing platform 102 in one aspect comprises a control device, such as a trackball or a touchpad (of the multi-touch type or not), that is linked to interface 106 and enable user 108 to control movement of a cursor on interface 106 in order to act on the user interface elements. Alternatively, computing platform 102 in one aspect only comprises a control device and is not configured for direct contact by user 108 on interface 106.

In some embodiments, interface 106 is configured to display the at least one frequency, including characteristics or "frequency information" of the communication center associated with each frequency displayed. For example, interface 106 in one aspect is configured to display the frequency assigned to a specific communication center by the International Civil Aviation Organization (ICAO), name of the communication center, services provided at the communication center, the designated operational control (DOC) of the communication center, boundaries of the flight information region (FIR), etc. In some embodiments, interface 106 is configured to display the at least one communication frequency and the frequency information in the form of lists, tables, maps, digital keypads, etc., in order to provide the at least one communication frequency and associated frequency information in a variety of display formats for ease of viewing, selection, manipulation, etc. Thus, user 108 is able to scroll through the at least one communication frequency on interface 106 and interact with the data presented.

Computing platform 102 and/or MM 104 in one aspect communicates with various nodes and/or databases in order to display such frequency information at interface 106. For example, computing platform 102 and/or MM 104 are configured to access a database or storage 110 storing ICAO data in order to retrieve frequency information associated with each frequency. Storage 110 represents any suitable entity (e.g., a non-transitory computer readable medium or a memory device) for storing data associated with communication frequencies, flight control information, aircraft operational data, broadcast services, air traffic control services, etc. Exemplary data stored at storage 110 includes assigned frequency information, FIR boundary information, services provided, etc.

In some embodiments, storage 110 is integrated with or accessible by MM 104, computing platform 102, or modules therein. In some aspects, storage 110 is located at a node distinct from MM 104 and/or computing platform 102. For example, storage 110 is associated with a storage device separate from computing platform 102.

In some aspects, computing platform 102 and/or MM 104 is/are configured to filter the at least one communication frequency, where there is more than one communication frequency displayed at interface 106, by flight step. For example, filtering the communication frequencies based on flight step removes those frequencies that do not correspond to ATC centers providing service for that particular flight step. Within the scope of this subject matter, "filtering" refers to the process of removing communication frequencies from a display that do not meet certain filter values or criteria (e.g., a certain flight step). This advantageously reduces the number of frequencies displayed on interface 106, and thereby aids aircraft crew in predicting the next communication frequency to be communicated to the aircraft by the current ATC center.

In some aspects, computing platform 102 and/or MM 104 is/are configured to sort the at least one communication frequency, where there is more than one communication frequency displayed at interface 106, by occupation rate. For example, computing platform 102 and/or MM 104 can be configured to prioritize the at least one communication frequency, where communication frequency values that are higher are assigned a higher priority in comparison to lower communication frequency values that are assigned a lower priority. Within the scope of this subject matter, "sorting" or "prioritizing" refers to the process of assigning and/or ranking communication frequency values in terms of their occupation rate, such that higher communication frequency values receive higher priority than lower ones. This advantageously sorts the at least one communication frequency values such that the higher priority values are more visibly displayed at interface 106, and thereby aids aircraft crew in predicting the next communication frequency to be communicated to the aircraft by the current ATC center. Where the communication frequencies are filtered based on communication frequency channel occupation rate, computing platform 102 and/or MM 104 is configured to communicate with a radio module, such as SDR module 112 (e.g., a computing platform, software executing on a processor, etc.). SDR module 112 in one aspect comprises a hardware component, such as a chip, to convert analog radio signal from the RX domain to the baseband digital domain, which is subsequently processed using basic software executed on a processor. SDR module 112 receives and transmits widely different radio protocols from a variety of different base stations and/or nodes, e.g., ATC centers, aircraft, etc. For example, as used in the current context, SDR module 112 receives VHF communications from ATC centers (e.g., base stations 1-N, FIG. 1) in the form of analog signals communicated through frequency communication channels. SDR module 112 also converts and processes the analog signals into digital signals, after which SDR module 112 cooperates with computing platform 102 and/or MM 104 to evaluate power levels of the digital signals in order to determine whether the VHF communications are noise or communications messages. The result of these determinations is transmitted to computing platform 102 and/or modules therein as inputs for measuring occupation rate of the frequency channels in question.

It should be noted that computing platform 102 and/or MM 104 and its components and functionality described herein constitute a special purpose computing device that improves the technological field of aircraft communications by filtering communication frequencies as well as sorting communication frequencies in order to reduce and/or organize the number of frequencies displayed on interface 106, and thereby aid aircraft crew in predicting the next communication frequency to be communicated to the aircraft by the current ATC center.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity.

Figure 2:
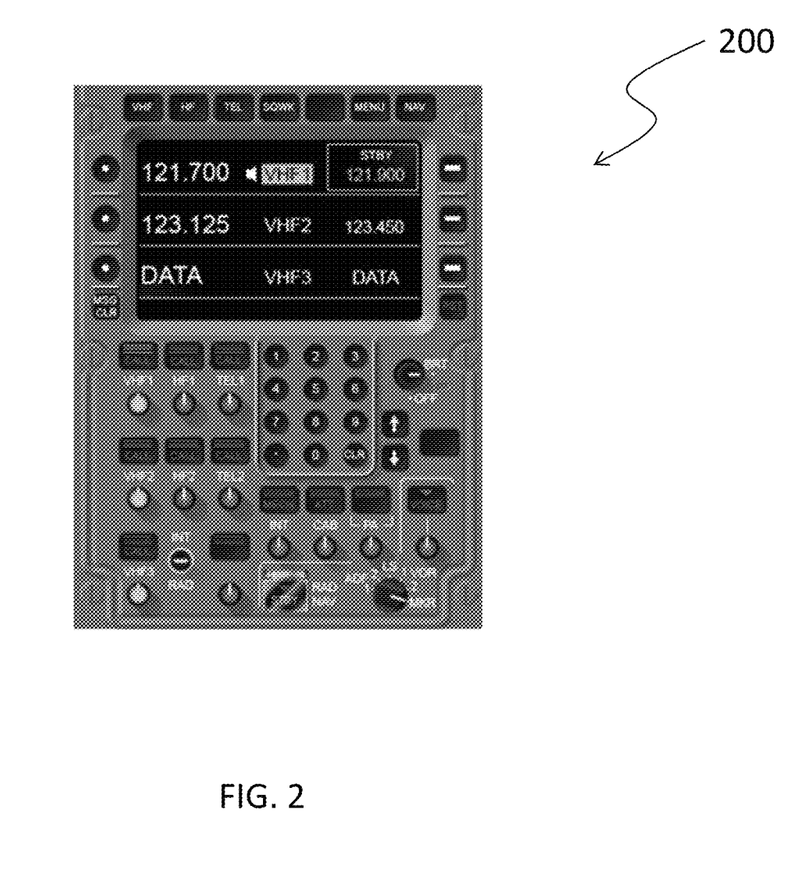
FIG. 2 is a screenshot illustrating an exemplary radio management panel (RMP) for managing aircraft radiofrequency communications according to an embodiment of the subject matter described herein.

Referring to FIG. 2, a screenshot 200 of an exemplary RMP that enables a pilot on board an aircraft to input communication frequencies is illustrated. In some aspects, the RMP illustrated in FIG. 2 may be an interface, such as interface 106 (see, e.g., FIG. 1). Typically, an ATC center may provide the pilot of an aircraft with a new communication frequency corresponding to a subsequent ATC center based on a geographic position of the aircraft, as well as a flight step. The pilot may then enter the new frequency into the RMP for communication with the subsequent ATC center. For example, screenshot 200 illustrates more than one VHF communication frequency displayed at the RMP. However, additional functionality may be added to the RMP and/or additional interface to support the pilot when he or she is entering a new communication frequency. In particular, functionality that may enable a pilot to predict which communication frequency may be communicated by an ATC center for communications with a subsequent ATC center may be utilized. For example, functionality that can filter and/or sort communication frequencies based on aircraft position, flight step, and/or occupation rate of the frequency channel can be implemented at RMP and/or another associated interface.

Figure 3:
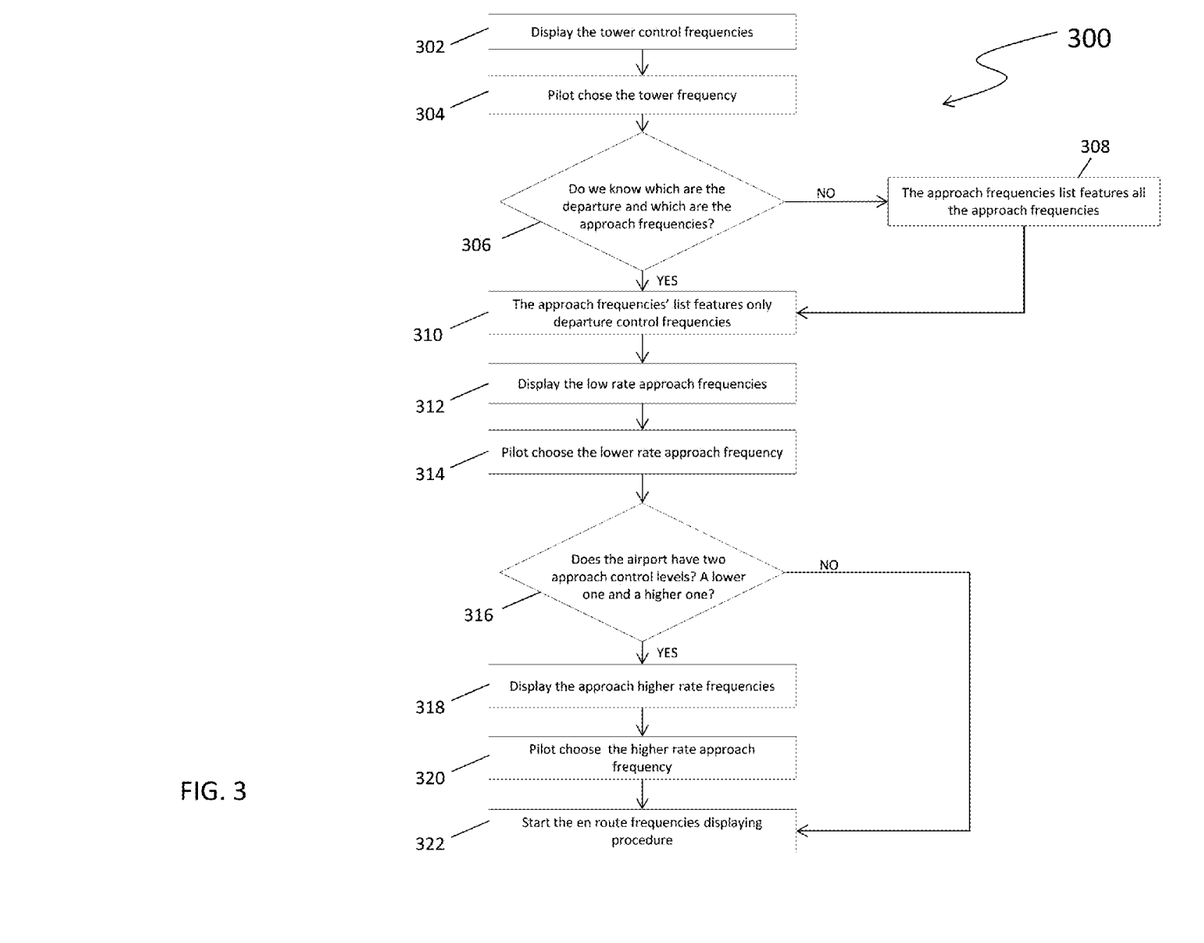
FIG. 3 is a flow chart illustrating steps of an exemplary process for displaying at least one communication frequency, the process being adapted based on a flight step of an aircraft, according to an embodiment of the subject matter described herein.

Referring now to FIG. 3, a flux diagram 300 of an exemplary process adaption based on a flight step of the aircraft is illustrated in accordance with the subject matter described herein. Flux diagram 300 is a pictorial illustration of the computation completed by computing platform 102 and/or MM 104 to adapt the determined communication frequencies to a specific flight step of the aircraft. For example, flux diagram 300 illustrates adapting process to determine at least one communication frequency corresponding to an ATC center that provides 'TOWER' services for display at an interface (e.g., 106) during a departure flight step of the aircraft.

Conventionally, departure and approach hand-off to different ATC towers follows a logical sequence of controllers based on airport jurisdiction. For example, during departure, the pilot contacts at least one ground controller, then tower controller, then at least one departure controller, and then moves into en route airspace. Thus, logically, during the departure flight step, once the pilot is in contact with the ground controller, the next frequency to be tuned to will be a tower frequency. However, this procedure is not always followed. For example, at large airports the aircraft can be handed off to two or three different ground controllers before reaching the tower controller. In another example, during periods of low traffic, tower control can pass the responsibility to supervise directly to an en route controller, since there may be no need to pass supervision to an intervening (e.g., departure controller) when there is not a high volume of traffic. Such periods of low traffic can manifest themselves in the form of low rate frequencies.

As a result, it is advantageous for the aircraft to be able to predict (e.g., using the adapted process illustrated in FIG. 3) whether a certain tower is experiencing low traffic and determine the next ATC center it is likely that the aircraft will be handed off to. Accordingly, the following process is adapted to predict whether certain towers are experiencing low or high traffic.

At step 302, at least one communication frequency corresponding to a tower control center is displayed on an interface. For example, a user 108 may select 'TOWER' service at an interface (e.g., interface 106), which will adapt the process as illustrated in flux diagram 300 to display at an interface at least one communication frequency corresponding to an ATC center that provides 'TOWER' services.

At step 304, a crew member of the aircraft (e.g., pilot or co-pilot) selects or chooses a communication frequency corresponding to a tower control center. For example, at interface 106, the crew member selects a tower frequency from the at least one displayed.

At step 306, a decision step as to whether the communication frequencies displayed are indicated as departure frequencies or approach frequencies is posed. For example, at interface 106 the communication frequencies displayed includes a characteristic as to whether the tower control center associated with that frequency provides departure or approach tower services. A determination is made as to whether the communications frequency provides departure or approach tower services based on data provided by, for example, storage 110.

In some aspects, interface 106 does not include a characteristic that differentiates whether the tower control center associated with that frequency provides departure or approach tower services. In these cases, flux diagram 300 moves onto step 308. At step 308, an interface displays all frequencies and corresponding tower control centers that provide either departure and/or approach services.

In some aspects, an interface includes a characteristic that differentiates whether the tower control center associated with a frequency provides departure or approach services. In these cases, flux diagram 300 moves onto step 310. At step 310, the at least one communication frequency displayed at an interface includes only the communication frequencies associated with a tower control center that provides departure services. Notably, in flux diagram 300, a flight step of the aircraft is departure. Were the flight step of the aircraft to be different, the process would be adapted to focus on the different flight step frequencies, e.g., approach frequencies, en route frequencies, etc.

Regardless, after either step 308 or step 310, flux diagram 300 can continue to step 312.

At step 312, and in one aspect, the frequencies displayed at an interface (e.g., interface 106) are only low rate approach frequencies.

At step 314, a crew member of the aircraft (e.g., pilot or co-pilot) selects or chooses a lower or lowest rate or level communications frequency from the list of low rate approach frequencies. For example, interface 106 may display only those approach frequencies considered "low rate" (e.g., step 312) and a crew member chooses or selects a lower or lowest one of those approach frequencies at interface 106. At step 316, a decision step as to whether the airport has two approach control levels (i.e., a lower approach control level or rate and a higher approach control level) is posed. The different approach control levels are a result of traffic complexity at a given time and are dependent on an airport's management of workload allocation.

In some embodiments, the airport in question does not have two different approach control levels. In these cases, flux diagram 300 moves onto step 322. At step 322, en route control frequency procedure is initiated. For example, a user 108 selects 'EN ROUTE' service at an interface.

Notably, the process illustrated in flux diagram 300 moves from step 316 to step 322 in this manner when the tower control center corresponding to the frequency selected at the destination airport is experiencing periods of low frequency and the destination airport does not have two approach control levels. Such periods of low frequency (i.e., low volume of approach traffic) can manifest themselves in the form of low rate frequencies. At times, during periods of low traffic, a tower control center passes the responsibility to supervise the flight directly to an en route controller, rather than an approach controller, since there is no need for an approach control center—although this is the usual order of supervision of an aircraft. In the interest of aiding the pilot in predicting a new frequency communicated to the pilot by an ATC center (e.g., tower control), during periods of low traffic the pilot chooses the lower rate approach frequency in step 314 since it is likely that the tower control center will bypass an approach controller and go directly to an en route controller.

In some aspects, the airport in question has two different approach control levels. In these cases, flux diagram 300 moves onto step 318. At step 318, the frequencies displayed at an interface are only high rate approach frequencies.

At step 320, the pilot chooses a higher rate approach frequency. For example, the pilot 108 chooses the higher rate approach frequency from a list of high rate approach frequencies displayed at interface 106.

At step 322, en route control frequency procedure is initiated. For example, a user 108 selects 'EN ROUTE' service at interface 106. Accordingly, regardless of whether the destination airport has two approach control levels, flux diagram 300 will be completed at step 322.

It will be appreciated that exemplary flux diagram 300 is for illustrative purposes and that different and/or additional actions can be used. It will also be appreciated that various actions described herein may occur in a different order or sequence.

Figure 4:
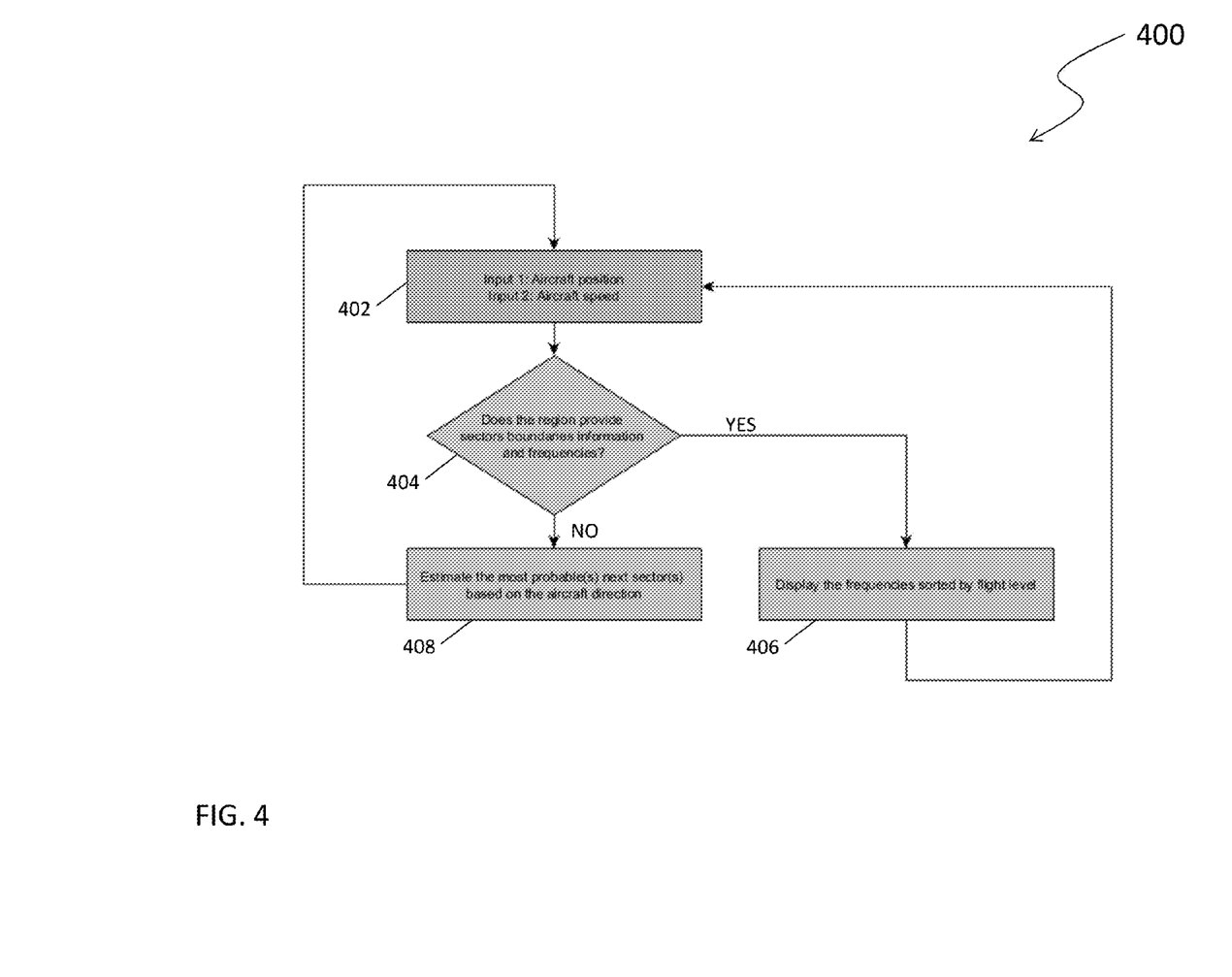
FIG. 4 is a flow chart illustrating steps of an exemplary process for displaying at least one communication frequency, the process being adapted based on a flight step of the aircraft different from the flight step of FIG. 3, according to an embodiment of the subject matter described herein.

Referring to FIG. 4, a flux diagram 400 of an exemplary process adaption based on a flight step of the aircraft is illustrated in accordance with the subject matter described herein. Flux diagram 400, in one aspect, is a pictorial illustration of the computation completed by MM 104 to adapt the displayed communication frequencies to a specific flight step of the aircraft. For example, flux diagram 400 illustrates adapting the process to determine at least one communication frequency corresponding to an en route or FIR sector for display at an interface (e.g., 106) during an en route flight step of the aircraft.

Conventionally, FIRs are specified regions in airspace, where each portion of the airspace belongs to a specific FIR. During en route flight, an aircraft will move from one FIR to a next as it crosses virtual boundaries between different FIRs. At each FIR a flight information service and an alerting service (ALRS) are provided. For the purposes of this disclosure, each FIR is considered an area with multiple frequencies. Thus, when an aircraft crosses into a new FIR, a new set of frequencies need be provided for the pilot.

As a result, it is advantageous for the aircraft to be able to predict (e.g., using the adapted process) the next sector to be crossed and display the frequencies associated with the sector or FIR. Accordingly, the following process is adapted to predict at least one possible next sector in which the aircraft will be in and to display the frequencies associated with the next sector, thereby removing any extraneous frequencies from interface 106.

At step 402, the process for determining at least one communication frequency can be adapted based on two inputs, i.e., input 1: aircraft position and input 2: aircraft speed. For example, management module 104 and/or computing platform 102 accesses data storage 110 and/or another storage module, database, etc., to determine a speed of the aircraft during a defined time period and an aircraft position (e.g., geospatial position and altitude) during the defined time period.

At step 404, a decision step as to whether an en route sector or FIR region in which the aircraft is currently in provides sectors boundaries information and frequencies is posed. For example, MM 104 queries and/or accesses a database (e.g., 110, FIG. 1) provided with data concerning each FIR and its associated boundaries and frequencies.

In some embodiments, database or storage (e.g., 110, FIG. 1) comprises sectors boundaries information and associated frequencies. For example, database 110 provides sectors boundaries information and associated frequencies for the FIR in which the aircraft is in for the defined time period. In these cases, flux diagram 400 continues to step 406. At step 406, at least one frequency is displayed and sorted by flight level. For example, at least one frequency is displayed at interface 106, where there is more than one frequency the frequencies can be sorted based on flight level or step.

In some embodiments, database or storage (e.g., 110, FIG. 1) does not comprise sectors boundaries information and associated frequencies. For example, database 110 only provides a minimum level of knowledge regarding the sector, where the minimum level of knowledge is only the flight level within which the pilot can contact the frequency. In these cases, flux diagram 400 continues to step 408. At step 408, the lack of information about sectors boundaries and frequencies for the FIR in which the aircraft is in for the defined time period results in estimating the most probable next sector(s) based on aircraft direction. For example, MM 104 and/or computing platform 102 uses a process to project, based on aircraft trajectory, the next FIR in which the aircraft will cross into in the hopes that storage 110 comprises more than the minimum level of knowledge regarding this future flight sector.

Regardless, after each of steps 406 and 408, flux diagram 400 returns to step 402 to adapt the process based on both aircraft position and aircraft speed during a newly defined time period. Flux diagram 400 continues in such a manner until the aircraft begins its descent.

It will be appreciated that exemplary flux diagram 400 is for illustrative purposes and that different and/or additional actions may be used. It will also be appreciated that various actions described herein may occur in a different order or sequence.

Figure 5:
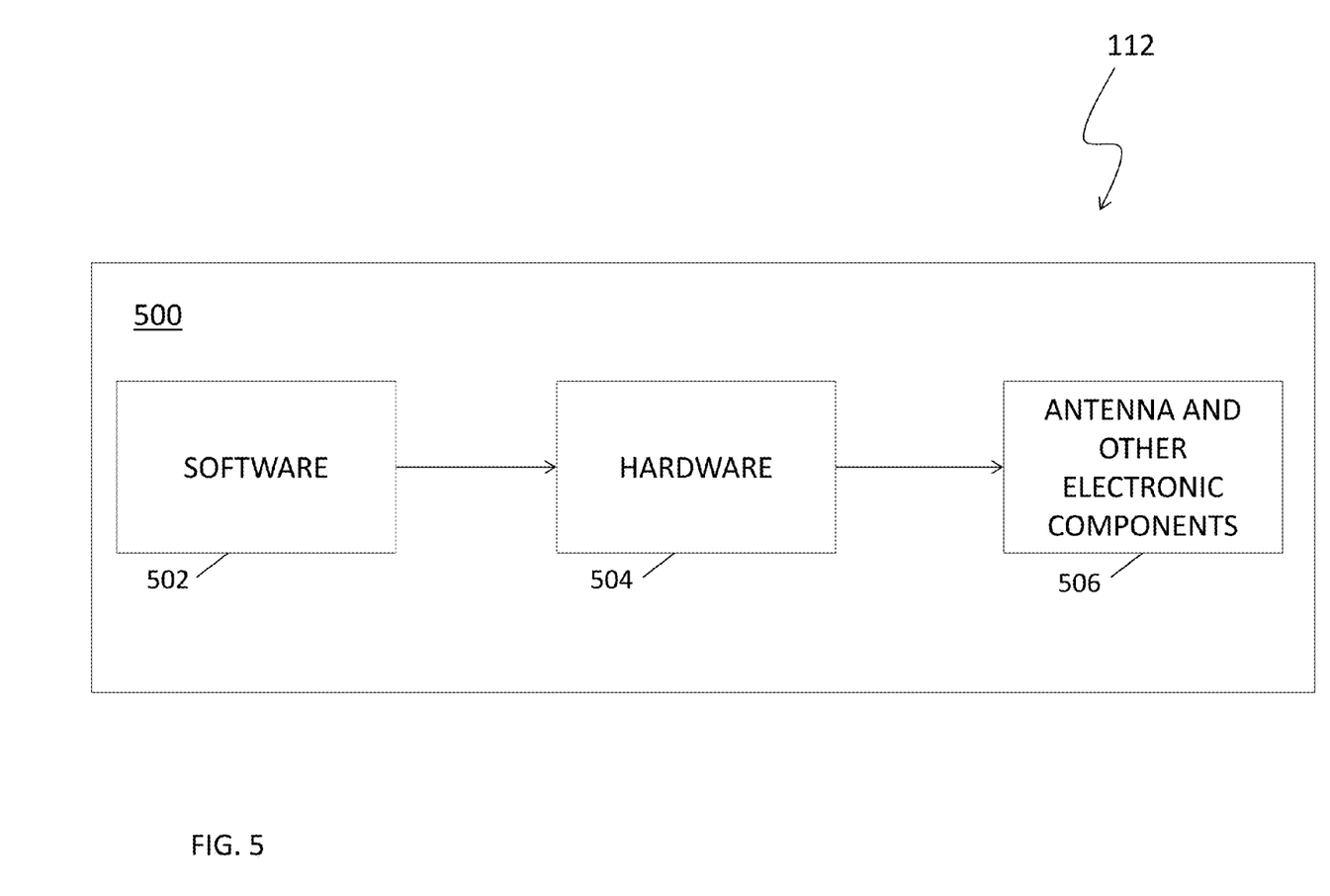
FIG. 5 is a block diagram illustrating an exemplary architecture for a software defined radio (SDR) module according to an embodiment of the subject matter described herein.

Referring now to FIG. 5, an SDR module is illustrated for processing a VHF communication signal from an RX airband to a baseband digital domain. Although signal processing is accomplished in any number of ways, the disclosure provided herein uses SDR as one exemplary cost effective and flexible approach. Typically, VHF voice transmissions are accomplished using amplitude modulation to allow distant actors (e.g., nodes) to establish communication with one another. When a message is modulated and sent using amplitude modulation, the power level increases around the carrier frequency. By measuring the power level within the frequency communication channel during small and defined periods of time, the time period that the message in that channel was sent is evaluated. Looking at the quantity of messages sent during a defined time period enables determination of an occupation rate of the channel. Notably, where there is a frequency communication channel(s) with a 'high occupation rate' there is a high probability of an ATC center providing the pilot with this frequency. Where is a frequency channel(s) with a 'very high occupation rate' there is a high probability that a 'silent' or very low frequency channel can be opened by the ATC center.

In some aspects, as illustrated in FIG. 5, an SDR module 112 comprises SDR architecture 500. Typically, SDR architecture comprises three components that interface together—software, hardware, and an antenna. The first component, software, is generally illustrated at box 502 in FIG. 5. Software 502 comprises any module capable of processing a received signal. For example, software 502 is configured to encrypt the signal, route the signal, and/or measure the signal. Software 502 stores the processed signal in a database, such as storage 110.

The second component, hardware, is generally illustrated at box 504 in FIG. 5. Hardware 504 comprises any receiver chip capable of amplifying, filtering, and/or converting a received radio signal. For example, hardware 504 is implemented in a DVB-TB dongle, which is connected to a computing platform (e.g., 102, FIG. 1). In some aspects, hardware 504 is configured to convert the received signal from the analog domain to the digital domain and output 8-bit I/Q-samples with a sample rate of 2.56 MS/s.

The third component, antenna, is generally illustrated at box 506 in FIG. 5. Antenna 506 can comprise any type of radio antenna or dongle that receives a transmitted radio signal so that hardware 504 can amplify or otherwise filter the received signal.

It will be appreciated that exemplary SDR architecture 500 is for illustrative purposes only and that different and/or additional components may be used in SDR architecture 500.

An SDR module 112, with an architecture similar to SDR architecture 500, is, thus, used to receive a VHF signal from a transmitter node (e.g., base stations 1-N, FIG. 1), which may be an ATC center or other aircraft. The signal received by SDR module 112 initially is received as an analog signal (e.g., RX airband domain signal), which SDR module 112 converts to a digital signal (e.g., baseband digital domain) and subsequently evaluate to determine whether the signal contains noise or a communication message.

Within the scope of this subject matter, any signal received, converted, and/or processed by SDR module 112 is considered a useful signal where the root mean square (RMS) value during a defined time period is higher than 3.5 times the standard deviation. ICAO defines minimum useful signal level as −82 dBm, whereas every signal that presents a power level under −96 dBm (i.e., −82 dBm with −14 dB of attenuation) should be considered noise. However, in situations where bad weather results in possible signal interference there is a need to amplify the received signal by a low noise amplifier. However, doing so also increases the noise level such that it becomes necessary that for any signal received, converted, and/or processed by SDR module 112 to be considered as useful signal, the RMS value during a defined period increases to at least 4 times the receiver noise RMS value.

Figure 6:
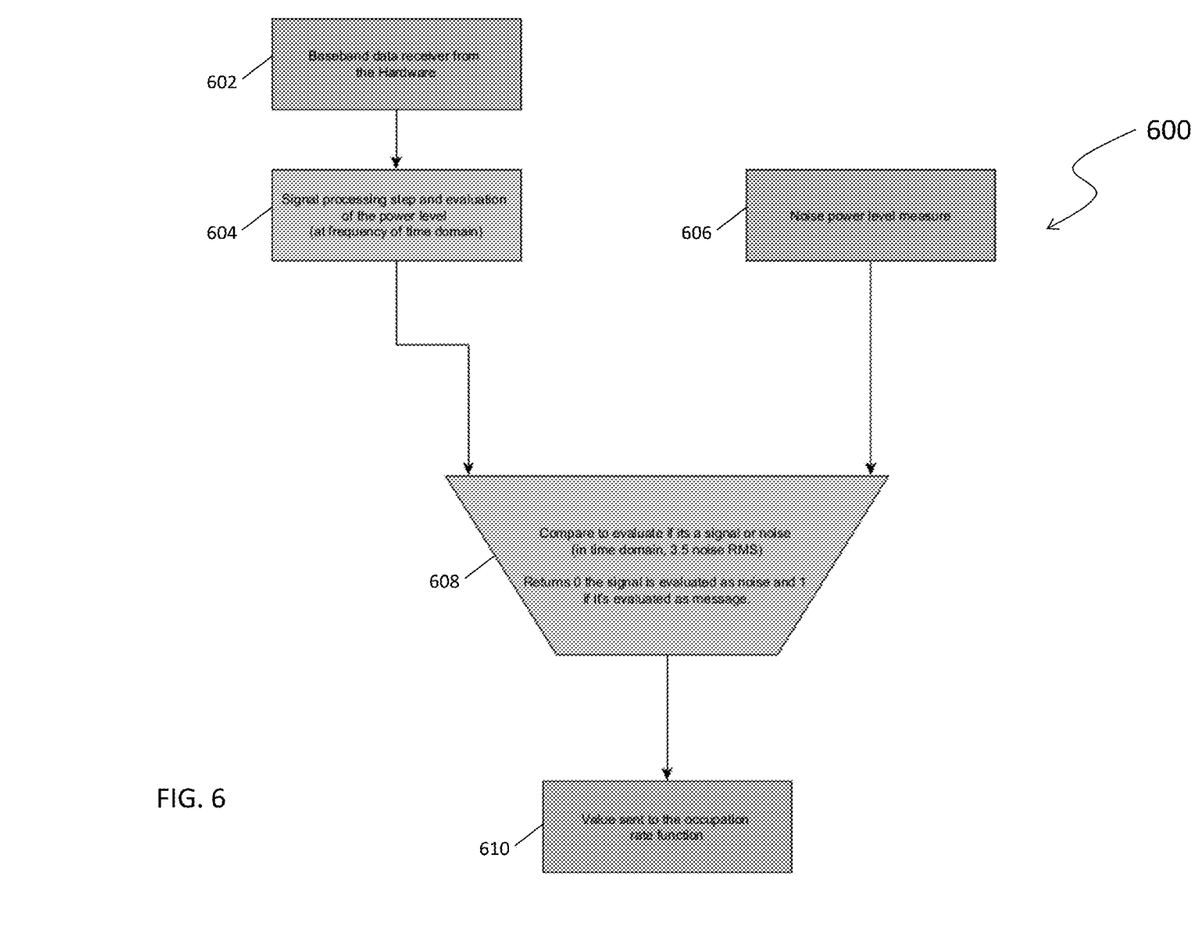
FIG. 6 is a flow chart illustrating steps of an exemplary process for evaluating whether a frequency communication channel associated with a selected communication frequency transmits a communication message or noise during a defined time period according to an embodiment of the subject matter described herein.

Consequently, the process discussed hereinabove prioritizes, using power level information of a signal to determine occupancy rate of a frequency communication channel, communication frequencies with a high occupancy rate. Referring to FIG. 6, a flux diagram 600 for evaluating a frequency channel of a frequency communication is illustrated herein. Specifically, flux diagram 600 shows an exemplary process used to measure whether a frequency channel is in use (i.e., transmitting a message rather than noise interference) during a defined time window.

At step 602, a receiver module transmits converted digital signals to associated software. For example, an SDR module 112 having SDR architecture 500 receives an analog VHF communication from a node or communication center (e.g., base station 1). In this example, a hardware component 504 (e.g., chip) of SDR converts the signal from the RX airband domain to the baseband domain.

At step 604, software receives the converted signal and processes the signal to evaluate the power level of the signal. For example, a software component 502 of SDR module 112 performs signal processing on the signal (e.g., resampling, demodulation, modem error correction, encryption, network routing, etc.) and measures the power level of the signal in terms of Decibel-milliwatts (dBm).

Independently of steps 602 and 604, at step 606 a noise power level measure is either be taken or accessed from a database or storage. For example, MM 104 and/or computing platform 102 accesses storage database 110 to determine the ICAO standard of minimum useful signal (e.g., −82 dBm) and minimum noise level (e.g., −96 dBm).

At step 608, the inputs received from steps 604 and 606 are compared to evaluate whether the received signal is noise or a communications message. If the comparison results in an evaluation that the signal is noise, a value of '0' is assigned to this received signal. By contrast, if the comparison results in an evaluation that the signal is a communications message, a value of '1' is assigned to this received signal.

Figure 7:
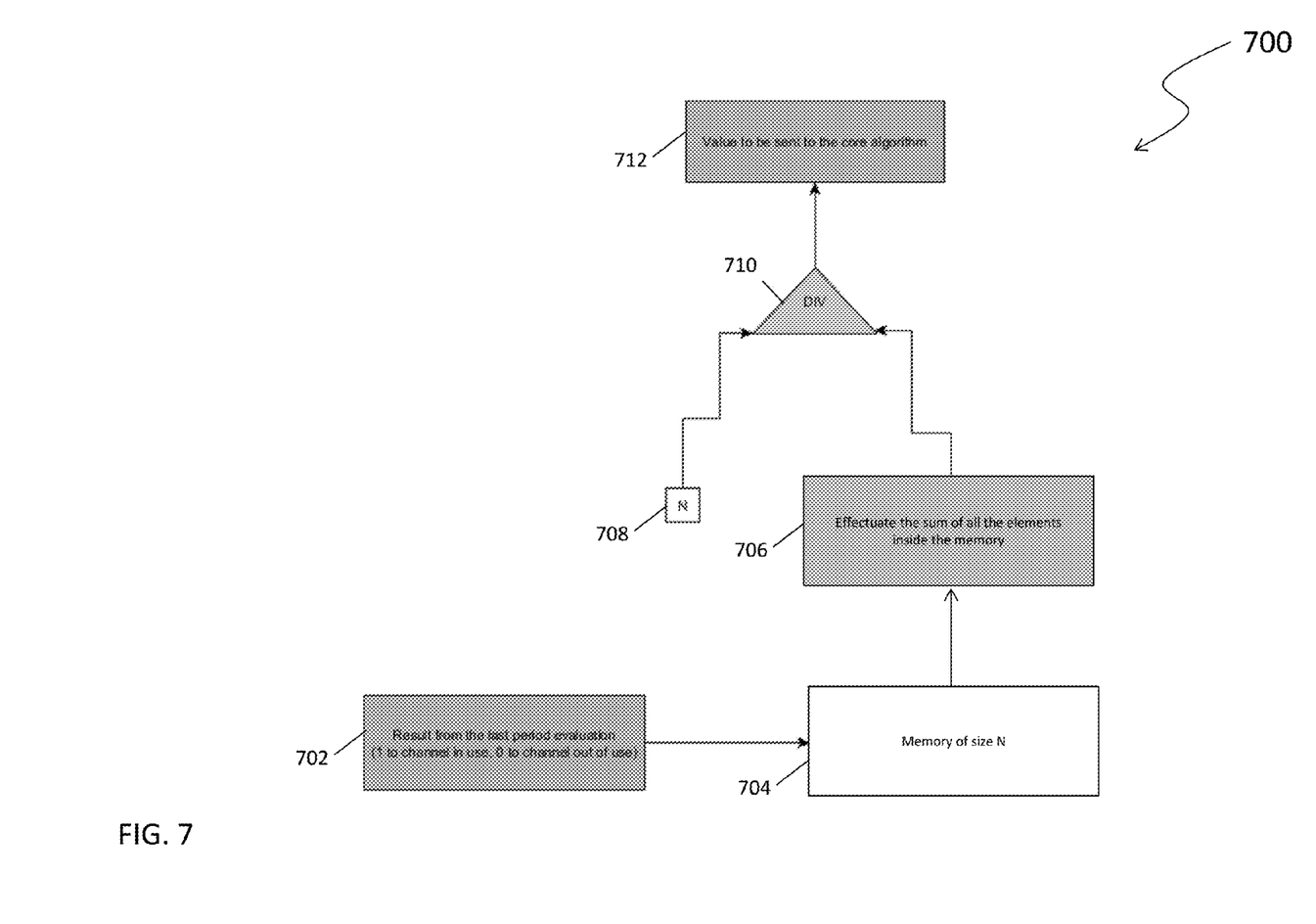
FIG. 7 is a flow chart illustrating steps of an exemplary process for calculating an occupation rate of a frequency communication channel during a defined time period according to an embodiment of the subject matter described herein.

Regardless, at step 610, the value of the signal (either '0' or '1') for that defined time period is output for further evaluation, see FIG. 7. For example, if the signal is determined to be a communications message, the signal will be assigned a value of '1' and a value of '1' can be output for further evaluation.

It will be appreciated that exemplary flux diagram 600 is for illustrative purposes and that different and/or additional actions may be used. It will also be appreciated that various actions described herein may occur in a different order or sequence.

Referring to FIG. 7, a flux diagram 700 for calculating an occupation rate of the communication channel (e.g., the channel evaluated in flux diagram 600) during a defined time period (t) is illustrated. Flux diagram 700 illustrates an exemplary process or function for calculating the occupation rate in terms of a ratio between an evaluation of when a communication message is transmitted from a node and a total number of samples (N) during a defined time period (t). For example, the occupation rate can comprise a value between 0 and 1.

In some embodiments, the occupation rate function or process is implemented in MM 104 and/or computing platform 102, or is implemented in a related node or module. For example, to implement the occupation rate function or process in computing platform 102, two storage units (e.g., registers) are configured for each communication channel defined by the process. At step 702, an input from the most recent evaluation of the channel (i.e., at the most recently defined period of time (t)) is transmitted as an input to the occupation rate evaluation function. For example, the value determined at step 610 in FIG. 6 is transmitted as in input to flux diagram 700. In this example, the input at step 702 will either be a value of '1' corresponding to an evaluation that the transmitted signal was a communications message or a value of '0' corresponding to an evaluation that the transmitted signal was noise.

At step 704, the value from step 702 is stored in a storage device. For example, the storage device comprises a memory of size 'N', where N is defined as the number of samples. Storage device comprises storage 110 or represents any suitable entity (e.g., a non-transitory computer readable medium or a memory device) capable of storing data.

At step 706, the elements (i.e., values) in the storage device are effectuated. For example, the elements in storage device 110 are summed. In this example, if storage device is storing three '0' elements and two '1' elements, effectuating these five elements results in a sum of '2'.

At step 708, the total number of samples (N) present in the storage device can be determined. For example, where storage device 110 comprises five elements or samples, the total number of samples (N) will be equal to five.

At step 710, the values from step 706 and 708 are input into a division function (DIV), such that the division function divides the total number of samples (N) by the sum of all the elements inside the storage device. For example, if at step 706 the value is '2' and at step 708 the total number of samples is '5', then DIV=2/5 or 0.4. Thus, the occupation rate of the channel during a defined period of time (t) is equal to 0.4, which is between 0 and 1.

At step 712, the value determined at step 710 is output to the core process (not shown) in order to effectively prioritize displayed frequency communication channels based on whether they have a higher or lower occupation rate.

In some aspects, an occupation rate of each frequency is compared to a determined saturation rate and/or silent rate. The saturation rate is percentage of time during a specified time window in which aircraft communications are occurring. In some aspects, for example, the saturation rate can be 0.8 or that communications are occurring for 80% of the time in a given time window (e.g., 60 seconds). The silent rate is whether or not there were any carrier frequency or human voice communications heard during a specified time window. In some aspects, for example, the time window for calculating the silent rate can be 15 minutes.

Where the occupation rate is higher than the saturation rate, then the radio frequency channel is considered saturated and may lead to an ATC center transferring aircraft communications to a previously silent frequency communication channel. For example, where a calculated occupation rate is 1.0 and a saturation rate is 0.8, the frequency communications channel would be considered saturated.

Conversely, where the occupation rate is lower than the saturation rate, then the occupation rate is compared to a silent rate. If the occupation rate is lower than the silent rate, the frequency is considered 'unused' and is removed from the frequencies displayed at the interface (e.g., interface 106). Notably, only those frequencies which have an occupation rate higher than the silent rate would be displayed and prioritized. For example, where a calculated occupation rate is 0.4 and a saturation rate is 0.8, the frequency communications channel would not be considered saturated, and would be compared to a silent rate. In this example, this frequency communications channel would be assigned a priority lower than other frequency communication channels having an occupation rate more than 0.4, and would be completely removed if the occupation rate was lower than a silent rate. It will be appreciated that exemplary flux diagram 700 is for illustrative purposes and that different and/or additional actions may be used. It will also be appreciated that various actions described herein may occur in a different order or sequence.

In some embodiments, flux diagrams 600 and 700 are used to determine the occupancy rate for each frequency displayed at interface 106. Any frequency channel experiencing a low period of traffic is prioritized at a priority lower than those channels experiencing higher periods of traffic. This provides a crew member(s) with an organized view of the displayed frequency values thereby simplifying evaluation of which frequencies may be communicated by a previous ATC center to the pilot. Consequently, filtering the communication frequencies enables easier corroboration or prediction of a radiofrequency of the new sector or next ATC jurisdiction.

Figure 8:
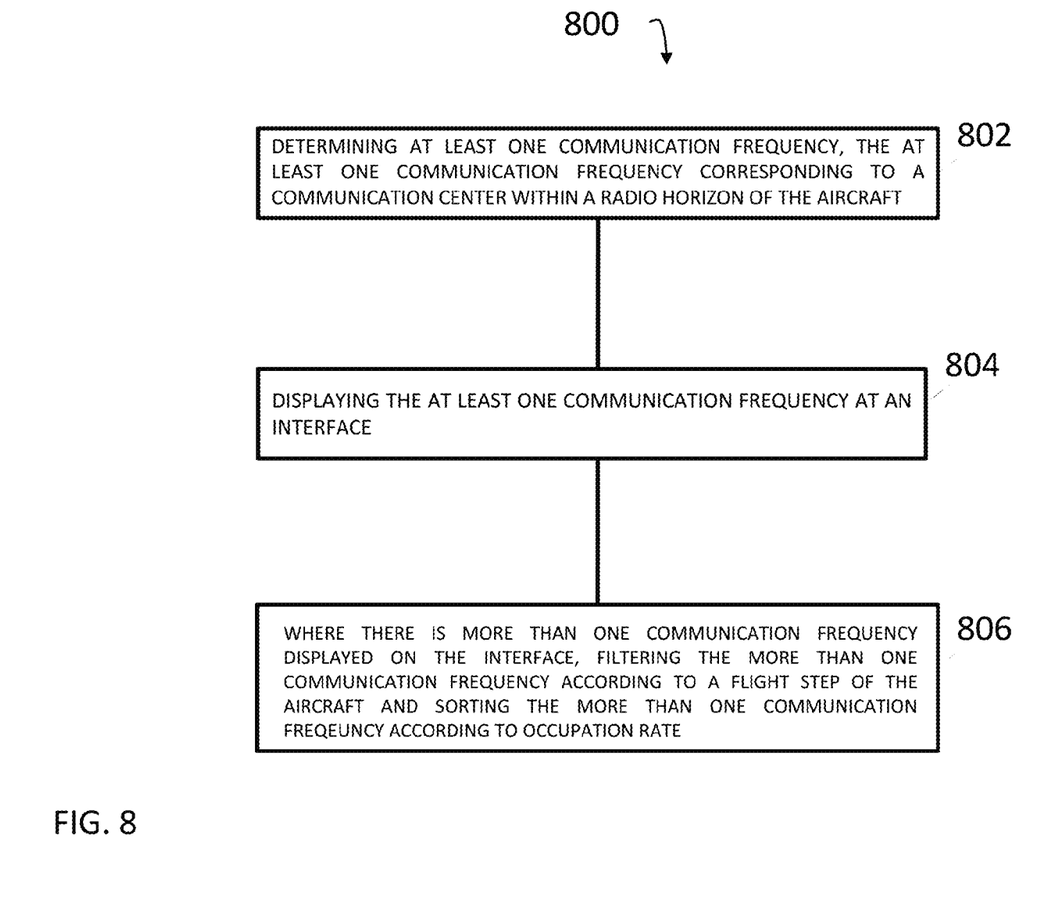
FIG. 8 is a flow chart illustrating an exemplary process for managing aircraft radiofrequency communications according to an embodiment of the subject matter described herein.

Referring to FIG. 8, an exemplary process 800 for managing aircraft radiofrequency communications is illustrated. In some embodiments, the exemplary process, or portions thereof, is/are performed by or at computing platform 102, MM 104, and/or another node or module. In some embodiments, exemplary process 800 includes steps 802, 804, and/or 806.

At step 802, at least one communication frequency is determined. For example, an algorithm (not shown) determines at least one communication frequency using a series of inputs, wherein the at least one communication frequency corresponds to an ATC center within a radio horizon of the aircraft.

At step 804, the at least one communication frequency is displayed at an interface. For example, an interface 106 displays the at least one communication frequency determined at step 802. In some embodiments, interface 106 is also be configured to display: a corresponding communication center; a distance of the corresponding communication center to the aircraft, based on a position of the aircraft; a type of service provided by the corresponding communication center; a DOC of the corresponding communication center; and FIR boundary information. Additional information can also be displayed.

At step 806, where there is more than one communication frequency displayed at interface 106, more than one communication frequency at least can be filtered according to a flight step of the aircraft in order to reduce a number of the more than one frequency displayed at interface 106. For example, a filter is applied to the determined communication frequencies and any frequencies that do not meet the requirements of the filter are removed.

In some aspects, filtering the more than one communication frequency according to the flight step of the aircraft can comprise removing from display at interface 106 any communication frequencies that correspond to communication centers not providing services relevant to a current flight step of the aircraft. For example, where a current flight step is a departure step, any communication frequencies that correspond to ATC centers that do not provide departure services can be removed from display at interface 106.

In some aspects, filtering the more than one communication frequency according to the flight step of the aircraft comprises estimating a next FIR.

Additionally, or instead of filtering the more than one communication frequency by flight step at step 806, at step 806 the more than one communication frequency can be sorted according to occupation rate in order to prioritize the more than one communication frequency displayed on interface 106. For example, an algorithm is applied which can determine an occupation rate of a communication channel.

In some aspects, sorting the more than one communication frequency according to the occupation rate can comprise evaluating whether a communication channel associated with a selected communication frequency transmits, in the form of a signal, a communication message or noise during a defined time period.

In some aspects, evaluating whether the communication channel associated with the selected communication frequency transmits, in the form of the signal, the communication message or noise during the defined time period can comprise processing the signal using an SDR module 112.

In some aspects, occupation rate can be defined as a ratio of a sum of instances in which the signal is evaluated as transmitting a communication message within the defined time period, and a number of samples, defined as a sum of instances of evaluating the communication channel as a communication message or noise, within the defined time period.

In some aspects, process flow 800 can further comprise comparing the occupation rate to a saturation rate, assigning a low priority to the communication channel if the occupation rate is lower than the saturation rate, and assigning a high priority to the communication channel if the occupation rate is higher than the saturation rate.

In some aspects, process flow 800 can further comprise comparing the occupation rate to a silent rate and removing the selected communication frequency if the occupation rate is less than the silent rate, where the occupation rate is lower than the saturation rate.

It will be appreciated that exemplary process flow 800 is for illustrative purposes and that different and/or additional actions may be used. It will also be appreciated that various actions described herein may occur in a different order or sequence.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for managing aircraft radiofrequency communications, on board an aircraft, the method comprising:
   determining a plurality of communication frequencies, each communication frequency corresponding to a communication center within a radio horizon of the aircraft;
   filtering the plurality of communication frequencies according to a current flight step of the aircraft, wherein filtering the plurality of communication frequencies comprises identifying at least one irrelevant communication frequency that corresponds to a first communication center not providing services relevant to the current flight step of the aircraft and identifying one or more relevant communication frequencies;
   sorting the one or more relevant communication frequencies according to occupation rate in order to prioritize the one or more relevant communication frequencies, and thereby aid in predicting a communication frequency communicated to the aircraft; and
   displaying the one or more relevant communication frequencies, sorted according to occupation rate, on a display device.

2. The method of claim 1, wherein filtering the plurality of communication frequencies according to the current flight step of the aircraft comprises estimating a next flight information region (FIR).

3. The method of claim 1, wherein sorting the one or more relevant communication frequencies according to the occupation rate comprises evaluating whether a communication channel associated with a selected communication frequency transmits, in the form of a signal, a communication message or noise during a defined time period.

4. The method of claim 3, wherein evaluating whether the communication channel associated with the selected communication frequency transmits, in the form of the signal, the communication message or noise during the defined time period comprises processing the signal using a software defined radio (SDR) module.

5. The method of claim 4, wherein the occupation rate is defined as a ratio of a sum of instances in which the signal is evaluated as transmitting a communication message within the defined time period, and a number of samples, defined as a sum of instances of evaluating the communication channel as a communication message or noise, within the defined time period.

6. The method of claim 5, further comprising comparing the occupation rate to a saturation rate, assigning a low priority to the communication channel if the occupation rate is lower than the saturation rate, and assigning a high priority to the communication channel if the occupation rate is higher than the saturation rate.

7. The method of claim 6, further comprising comparing the occupation rate to a silent rate and removing the selected communication frequency if the occupation rate is less than the silent rate, where the occupation rate is lower than the saturation rate.

8. A system for managing aircraft radiofrequency communications, on board an aircraft, the system comprising:
   a computing platform comprising at least one processor and memory; and
   a management module utilizing the at least one processor and the memory, wherein the management module is configured to:
      determine a plurality of communication frequencies, each communication frequency corresponding to a communication center within a radio horizon of the aircraft;
      filter the plurality of communication frequencies according to a current flight step of the aircraft, wherein filtering the plurality of communication frequencies comprises identifying at least one irrelevant communication frequency that corresponds to a first communication center not providing services relevant to the current flight step of the aircraft and identifying one or more relevant communication frequencies;
      sort the one or more relevant communication frequencies according to occupation rate in order to prioritize the one or more relevant communication frequencies, and thereby aid in predicting a communication frequency communicated to the aircraft; and
      display the one or more relevant communication frequencies, sorted according to occupation rate, on a display device.

9. The system of claim 8, wherein the management module is configured to estimate a next flight information region (FIR) in order to filter the plurality of communication frequencies according to the current flight step of the aircraft.

10. The system of claim 8, wherein the management module is configured to evaluate whether a communication channel associated with a selected communication frequency transmits, in the form of a signal, a communication message or noise during a defined time period.

11. The system of claim 10, wherein the management module is configured to process the signal using a software defined radio (SDR) module.

12. The system of claim 11, wherein the occupation rate is defined as a ratio of a sum of instances in which the signal is evaluated as transmitting a communication message within the defined time period, and a number of samples, defined as a sum of instances of evaluating the communication channel as a communication message or noise, within the defined time period.

13. The system of claim 12, wherein the management module is configured to compare the occupation rate to a saturation rate, to assign a low priority to the communication channel if the occupation rate is lower than the saturation rate, and to assign a high priority to the communication channel if the occupation rate is higher than the saturation rate.

14. The system of claim 13, wherein the management module is configured to compare the occupation rate to a silent rate and to remove the selected communication frequency if the occupation rate is less than the silent rate, where the occupation rate is lower than the saturation rate.

15. A non-transitory computer readable medium comprising computer executable instructions embodied in the computer readable medium that when executed by a processor of a computer perform steps comprising:
   determining a plurality of communication frequencies, each communication frequency corresponding to a communication center within a radio horizon of an aircraft;
   filtering the plurality of communication frequencies according to a current flight step of the aircraft, wherein filtering the plurality of communication frequencies comprises identifying at least one irrelevant communication frequency that corresponds to a first communication center not providing services relevant to the current flight step of the aircraft and identifying one or more relevant communication frequencies;
   sorting the one or more relevant communication frequencies according to occupation rate in order to prioritize the one or more relevant communication frequencies, and thereby aid in predicting a communication frequency communicated to the aircraft; and
   displaying the one or more relevant communication frequencies, sorted according to occupation rate, on a display device.

16. The non-transitory computer readable medium of claim 15, wherein sorting the one or more relevant communication frequencies according to the occupation rate comprises evaluating whether a communication channel associated with a selected communication frequency transmits, in the form of a signal, a communication message or noise during a defined time period.

17. The non-transitory computer readable medium of claim 16, wherein evaluating whether the communication channel associated with the selected communication frequency transmits, in the form of the signal, the communication message or noise during the defined time period comprises processing the signal using a software defined radio (SDR) module.

18. The non-transitory computer readable medium of claim 17, wherein the occupation rate is defined as a ratio of a sum of instances in which the signal is evaluated as transmitting a communication message within the defined time period, and a number of samples, defined as a sum of instances of evaluating the communication channel as a communication message or noise, within the defined time period.

19. The non-transitory computer readable medium of claim 18, further comprising comparing the occupation rate to a saturation rate, assigning a low priority to the communication channel if the occupation rate is lower than the saturation rate, and assigning a high priority to the communication channel if the occupation rate is higher than the saturation rate.

20. The non-transitory computer readable medium of claim 19, further comprising comparing the occupation rate to a silent rate and removing the selected communication frequency if the occupation rate is less than the silent rate, where the occupation rate is lower than the saturation rate.

* * * * *